No. 674,165. Patented May 14, 1901.
E. B. JOHNSTON & E. CINDEL.
NUT LOCK.
(Application filed Feb. 27, 1901.)
(No Model.)
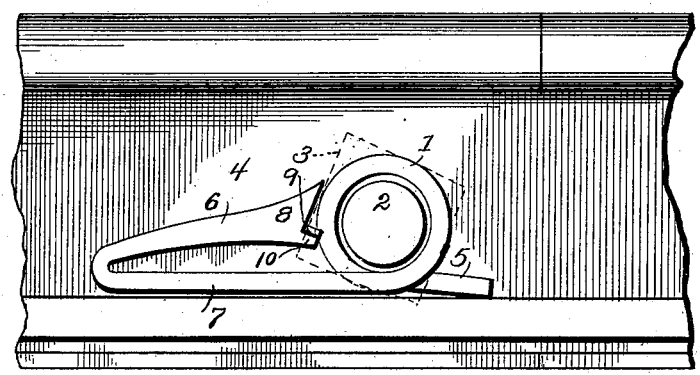
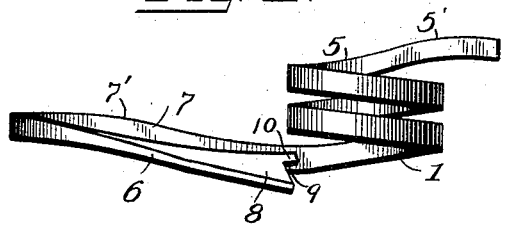
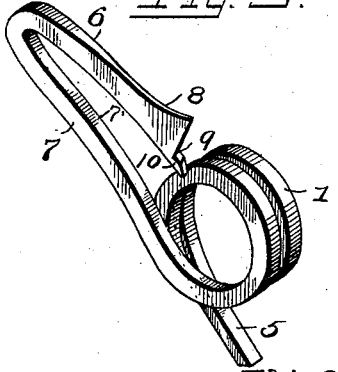
Eli Cindel and
Ephraim B. Johnston Inventors
Witnesses
by
Attorneys.

UNITED STATES PATENT OFFICE.

EPHRAIM B. JOHNSTON AND ELI CINDEL, OF LEAD, SOUTH DAKOTA.

NUT-LOCK.

SPECIFICATION forming part of Letters Patent No. 674,165, dated May 14, 1901.

Application filed February 27, 1901. Serial No. 49,048. (No model.)

*To all whom it may concern:*

Be it known that we, EPHRAIM B. JOHNSTON and ELI CINDEL, citizens of the United States of America, residing at Lead, in the county of Lawrence and State of South Dakota, have invented certain new and useful Improvements in Nut-Locks, of which the following is a specification, reference being had therein to the accompanying drawings.

This invention relates to certain new and useful improvements in nut-locks, and is particularly adapted for use in connection with railroads.

The invention has for its object to construct a nut-lock which will hold the nut and prevent the loosening of the same, but which will at the same time permit the tightening of the nut as may be required or desired.

Briefly described, the invention comprises a bar of metal having a desired resiliency and which is bent in a double coil to form a spring-washer that receives the bolt. One end of the bar extends outwardly at right angles to the axis of the washer, and the other end extends outwardly, also at right angles to the axis of the washer, from the opposite side of the spring-washer and on a parallel plane with the other arm. This latter arm is doubled back upon itself to form a substantially V-shaped member, the upper arm of which is flattened and has its free end notched or shouldered to receive the nut to be locked. All of this construction will be hereinafter more specifically described and then particularly pointed out in the appended claims, and in describing the invention in detail reference will be had to the accompanying drawings, forming a part of this specification, and wherein like numerals of reference will be employed for designating like parts throughout the different views, in which—

Figure 1 is a side elevation of a part of a railroad rail and fish-plate, showing our improved nut-lock in position for locking the nut, with the latter in dotted lines. Fig. 2 is a top plan view of our improved nut-lock, and Fig. 3 is a detail perspective view of the same.

To put our invention into practice, we provide a bar of metal having sufficient resiliency to form a spring-washer and spring-arm for the purposes that will be hereinafter explained. This bar or rod may be of any form in cross-section, though, as herein shown, we have illustrated a bar which is in cross-section substantially square and is wound or coiled into a double coil 1, forming a spring-washer, which is adapted to receive the bolt 2 and when the device is in position to lie between the nut 3 and the fish-plate 4. The double coil constituting the washer terminates in an arm 5 at the inner face of the washer, this arm being curved and extending outwardly at right angles to the axis of the washer and is adapted to lie upon the upper face of the flange of the fish-plate 4 and against the outer face of said fish-plate. The bar at the other side of the washer extends outwardly at right angles to the axis of the washer, in the opposite direction to the curved arm 5, but on substantially the same plane therewith, and is then bent backwardly upon itself, forming an upper member 6 and a lower member 7. The latter is adapted, like the arm 5, to lie upon the upper face of the flange of the fish-plate and against the outer face of the latter, while the upper arm or member is flattened, as shown at 8, and is slightly turned outwardly and has its free end notched, as at 9, with the shoulder 10, formed by said notch, beveled, so as to readily pass the nut as the latter is being tightened.

It will be observed that the bow 5' and bow 7' of the arms 5 and 7 both extend in the same direction—namely, inwardly toward the fish-plate—and these bowed portions of the arms engage the outer face of the fish-plate, so that considerable more space is afforded for the tightening of the nut than would be the case were these two arms to extend out straight at right angles to the washer.

In practice the nut is placed on the bolt after the locking device has been placed on said bolt against the fish-plate and the nut screwed up, so as to partially compress the spring-washer, and thus cause the latter to exert a pressure against the nut. The notch which is made in the flattened end of the arm 6, having its wall at an incline, permits the nut to be readily forced upwardly in the process of tightening, but prevents any backward movement of said nut, as will be readily apparent. The arms 6 and 7 form a substantially V-shaped member, the lower arm resting on the fish-plate to prevent the turning of the washer from its proper position and the upper arm acting to engage the nut and lock the latter in position. When it is desired to remove the nut, it will only be necessary to engage the flattened end of the arm with an instrument—such, for instance, as a screw-driver—and force the arm inwardly under pressure, so as to disengage the same from the nut, and thus permit the unscrewing of the latter, this arm upon the pressure being released springing back to its normal position, as will be readily apparent.

Having fully described our invention, what we claim as new, and desire to secure by Letters Patent, is—

1. A device of the character described, comprising a bar of resilient metal bent in a double coil to form a spring-washer, with one end extending outwardly at right angles to the axis of the washer, and the other end extending outwardly in the opposite direction, said latter end being bent upwardly and backwardly upon itself with the end thereof notched to receive the nut.

2. A device of the character described, comprising a bar of resilient metal bent in a double coil to form a spring-washer with one end of the bar extending outwardly at right angles to the axis of the washer, and the other end extending outwardly from the opposite side of the washer, in the opposite direction and upon the same plane, said latter end being bent upwardly and backwardly upon itself and being flattened, with its free end notched, substantially as described.

3. In a device of the character described, a double-coil spring-washer terminating at one side in a curved arm extending outwardly at right angles to the axis of the washer, said washer terminating at its other side in a V-shaped member, the lower arm of which is on the same plane as the curved arm, and the upper arm of which is notched to engage the nut to be locked, substantially as described.

In testimony whereof we affix our signatures in the presence of two witnesses.

EPHRAIM B. JOHNSTON.
ELI CINDEL.

Witnesses:
EARL ELLSWORTH,
M. E. RYTHER.